July 17, 1928.
E. K. HUNTER
1,677,778
AUTOMATIC FOCUSING OPTICAL PROJECTION APPARATUS
Original Filed Sept. 20, 1922
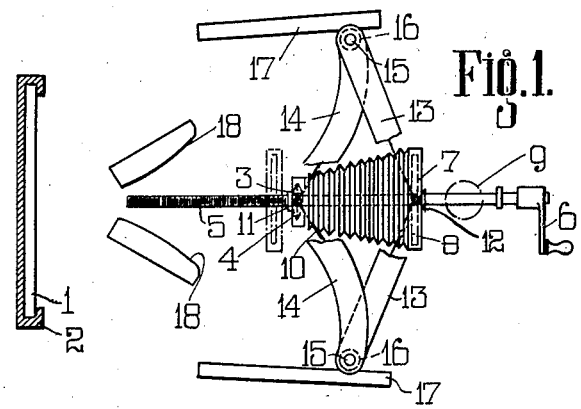
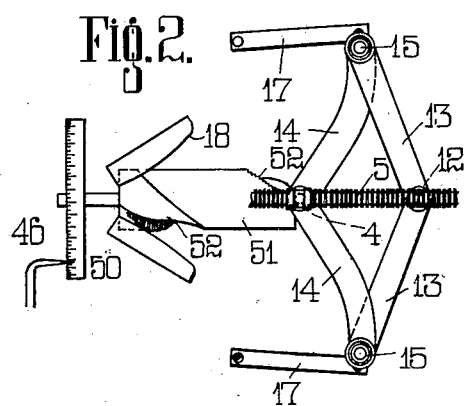
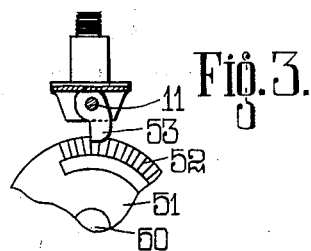
Inventor
Edgar Kenneth Hunter.
By Sturtevant & Mason
Attorneys Patented July 17, 1928.

1,677,778

UNITED STATES PATENT OFFICE.

EDGAR KENNETH HUNTER, OF LONDON, ENGLAND, ASSIGNOR TO JOHANNES ROBERT CARL AUGUST, OF LONDON, ENGLAND.

AUTOMATIC FOCUSING OPTICAL-PROJECTION APPARATUS.

Original application filed September 20, 1922, Serial No. 589,365, and in Great Britain September 21, 1921. Divided and this application filed December 18, 1925. Serial No. 76,288.

The present invention relates to apparatus for enlarging or otherwise copying in which the focus is maintained automatically while adjusting for various scales of enlargement or reduction and is a division of my co-pending application Serial No. 589,365, filed Sept. 20, 1922.

The object of the present invention is to provide a simplified construction of apparatus embodying such cam controlled mechanism and which will automatically by adjustment of a single member either enlarge an image or reduce it as desired.

In apparatus according to the present invention the lens is positively actuated, for example, by a screw shaft, and is connected to the other movable element by levers pivoted together and pivoted to the lens and to the other movable element, the levers being controlled by one cam surface for the enlarging range and by a second cam surface for the range for reduction. The pair of pivoted levers and the cams may be duplicated.

The invention is more particularly described with reference to the accompanying drawings in which:—

Figure 1 is a diagrammatic plan view of an arrangement according to the present invention.

Figure 2 is a corresponding view of the linkage and its controlling mechanism.

Figure 3 is a detail.

In the arrangement shown in reference to Figure 1 the receptive surface may comprise a plate such as 1 inserted within a fixed holder 2 whilst a lens element 3 in a carrier 4 is displaced along its optical axis by means of a nut upon it engaging with a threaded spindle 5 operated by means of a hand-crank 6. A frame 7 is provided to receive a slide 8 or other translucent object to be illuminated by a source of light 9. This carrier 7 for the object 8 is connected to the lens element 3 by means of bellows 10 of usual construction and is guided along the optical axis.

Two pairs of hinged levers 13, 14 forming a lazy-tongs are connected to bracket extensions of the lens carrier 4 and frame 7 by pivots 11, 12 respectively whose axes intersect the optical axis; thus the pivots are constantly guided along a line parallel to the optical axis. The outer pivots 15 of the links have rollers 16 held in engagement with cams 17, for example, by means of a weight or spring. Thus as the lens element 3 is progressively moved towards the fixed receptive surface 1 by means of the hand-crank 6 so will the object 8 follow the lens element 3 along the optical axis at a slightly lesser rate of displacement until the object has reached a position such as that indicated in dotted lines, which will correspond to the position of equal or unitary size of image projection in which the lens element 3 will then lie at the principal focus point between the slide 1 and the object 8.

Further progression of the lens element 3 towards the receptive surface 1 by a continued operation of the hand-crank 6 then brings the sides of the toggle links 14 into engagement with the cams 18 which for all further forward movement of the lens control the toggle links so that the object 8 moves in the reverse direction to the movement of the lens. It follows that the rollers 16 will be constrained to leave the cams 17 which are inoperative, only one set of cams, either 17 or 18 being operative at one time.

Due to the progressive forward movement of the pivot 11 along the optical axis the front sides of the links 14 are pushed against the cams 18 and slide on these as the pivots 15 are drawn inwards towards one another.

The cams 17, 18 will be plotted in such manner that the linkage 13, 14 maintains the Newtonian law of distances between the receptive surface 1 and the lens 3 and the distance of this lens 3 from the object 8.

It will be desirable to provide means for indicating the particular size of magnification or reduction of the image. This may be done by a scale attached to any of the moving members or as shown in Figures 2 and 3 by placing a graduated disc 46 on a spindle 50 mounted in bearings (not shown) to lie parallel with but below the optical axis. The spindle carries a spiral step drum 51 each step of which 52 corresponds with a particular ratio of magnification or reduction of the image. With such construction, as the pivot 11 of the linkage is fed forward by the threaded spindle 5, a pawl finger 53 on the pivot 11 will be moved forward with it until it will come against the desired said step 52 on the shaft 50, whereupon the further displacement of the lens and consequent displacement of the object will be arrested.

It will be seen that by the above means it will be possible to very accurately and rapidly set the parts for any desired ratio of magnification or reduction and this setting can be repeated when desired.

I declare that what I claim is:—

1. An optical projection system comprising an object holder, an image holder, a lens holder, movable mounts for two of said holders, a cam controlling the displacement of one holder in a forwardly progressive direction, a second cam controlling the movement of the other holder, first in a forwardly progressive direction and then in a reverse direction, and means to provide relative displacement between said holders and said cams whilst maintaining the relationship of the three holders according to the Newtonian law of conjugate foci.

2. An optical projection system comprising an object holder, an image holder, a lens holder, movable mounts for two of said holders, a cam controlling the displacement of one holder in a forwardly progressive direction, a second cam controlling the movement of the other holder, first in a forwardly progressive direction and then in a reverse direction, and means to provide relative displacement between said holders and said cams whilst maintaining the relationship of the three holders according to the Newtonian law of conjugate foci, a drum controlling said relative motion between said cam surfaces and said holders, and means to angularly rotate said drum so that equal angular displacements of the drum correspond to equal linear increases in size of the image projected.

3. An optical projection system comprising an image holder, an object holder, a lens, a toggle linkage between said lens and said object holder, means to progressively displace the lens along the optical axis, a set of cams controlling the floating pivot of said toggle linkage during said progressive displacement, means to further progressively displace the lens along the optical axis, and a second set of cams controlling the side of one link of said toggle linkage during said further progressive displacement.

In witness whereof, I have hereunto signed my name this 4th day of December, 1925.

EDGAR KENNETH HUNTER.